(12) United States Patent
Meier

(10) Patent No.: US 7,577,277 B2
(45) Date of Patent: Aug. 18, 2009

(54) METHOD OF BINARIZING IMAGES CONTAINING LINEAR STRUCTURES

(75) Inventor: Reinhard Meier, Buxtehude (DE)

(73) Assignee: NXP B.V., Eindhoven (NL)

( * ) Notice: Subject to any disclaimer, the term of this patent is extended or adjusted under 35 U.S.C. 154(b) by 283 days.

(21) Appl. No.: 10/541,652

(22) PCT Filed: Dec. 15, 2003

(86) PCT No.: PCT/IB03/06034

§ 371 (c)(1),
(2), (4) Date: Jul. 7, 2005

(87) PCT Pub. No.: WO2004/063975

PCT Pub. Date: Jul. 29, 2004

(65) Prior Publication Data

US 2006/0083410 A1    Apr. 20, 2006

(30) Foreign Application Priority Data

Jan. 9, 2003   (EP) ................................ 03100025

(51) Int. Cl.
*G06K 9/00* (2006.01)
(52) U.S. Cl. .................... 382/124; 382/261
(58) Field of Classification Search ............ 382/117, 382/124
See application file for complete search history.

(56) References Cited

U.S. PATENT DOCUMENTS

| | | | | |
|---|---|---|---|---|
| 5,631,971 A * | 5/1997 | Sparrow | ............... | 382/125 |
| 5,926,555 A * | 7/1999 | Ort et al. | ............... | 382/124 |
| 7,072,523 B2 * | 7/2006 | Bolle et al. | ............... | 382/254 |
| 7,142,699 B2 * | 11/2006 | Reisman et al. | ............... | 382/124 |
| 2005/0163394 A1 * | 7/2005 | Scholze et al. | ............... | 382/260 |
| 2005/0232472 A1 * | 10/2005 | Scholze | ............... | 382/124 |

OTHER PUBLICATIONS

Hong L et al: "Fingerprint Image Enhancement:Algorithm and Performance Evaluation", IEEE Transactions on Pattern Analysis and Machine Intelligence, IEEE Inc. New York, US, vol. 20, NR. 8, pp. 777-789, Aug. 1998.
Kaser S et al: "Fingerprint Feature Enhancement Using Block-Directing on Reconstructed Images" Information Communications and Signal Processing, 1997. ICIS., Proceedings of 1997 International Conference on Singapore Sep. 9-12, 1997, New York, NY, USA, IEEE, US pp. 721-725.

* cited by examiner

*Primary Examiner*—Bhavesh M Mehta
*Assistant Examiner*—Michael Vanchy, Jr.

(57) ABSTRACT

In a method of binarizing images containing linear structures, and particularly images of prints from the skin, areas are determined that are each distinguished by a preset approximate direction of the structures. The areas of the image that are determined are each filtered with a Gabor filter adapted to the given direction. The method according to the invention can advantageously be implemented into a system for analyzing and binarizing images containing linear structures, and particularly images of prints from the skin. Such systems can advantageously be used for identifying human individuals and are especially intended for access control and the like.

16 Claims, 2 Drawing Sheets

METHOD OF BINARIZING IMAGES CONTAINING LINEAR STRUCTURES

The invention relates to a method of binarizing images containing linear structures, and particularly images of prints from the skin. The invention further relates to a system for binarizing images containing linear structures, and particularly images of prints from the skin, using such a method.

To allow features to be extracted, particularly from images of prints from the skin such as fingerprints, it is particularly important for the structures to be represented in binary form as far as possible without any disruptive influences. Gabor filters have proved successful at bringing out linear structures, and for that reason they are also used for the pre-processing of images of fingerprints. However, Gabor filters call for a considerable amount of computing work because of the convolution of the filter matrix with the pixels of the image. At the same time, it is also necessary for Gabor filters to be adjusted or adapted to the changing direction of the structures.

It is an object of the invention to generate a high-quality binary image, which can then be used for feature extraction, with the least possible effort and expense.

This object is achieved in accordance with the invention by determining areas that are each distinguished by a preset approximate direction of the structures and by filtering the areas of the image that are determined each with a Gabor filter that is adapted to the given direction.

The method according to the invention has the following advantages:

a. Little computing work to produce a high-quality binary image of a fingerprint.

b. The region of interest is obtained as a by-product.

c. It is easily possible for the quality of the image to be determined.

d. The regions in which direction is consistent can be used to home in the search for singularities (irregularities in the directional pattern in the fingerprint; usually referred to as "cores" or "deltas" depending on type).

The method manages with images having little depth of color. Tests on images containing 16 shades of gray produced results equivalent to those given by images containing 256 shades of gray.

There are, it is true, various known methods of determining the direction of structures, such as gradient methods, for example. However, an advantageous embodiment of the method according to the invention comprises determining the areas tile by tile of the tiles into which the image is divided with further Gabor filters of appropriate directions. Provision is preferably made in this case for four further Gabor filters to be used. It is also particularly beneficial in this case if the directions of the further Gabor filters are determined by angles to an edge of the image of 22.5°, 67.5°, 112.5° and 157.5°. These filters, which are primarily intended to determine the direction of the structure, may be greatly simplified, which means that the computing effort required for this purpose is low.

To allow the direction to be determined, provision may further be made, for determining the areas, for a variance for the individual filter response to be derived from the filter responses, tile by tile of the tiles into which the image is divided, and for tiles that show a variance that is higher than a preset threshold value to be assigned to the given area.

In an advantageous development of this embodiment, the derivation of the variances is performed by deriving the variances for tiles that overlap one another. Provision is preferably made in this case for, at a resolution of approximately 500 dpi, the size of the tiles used for deriving the variance to be 16×16 pixels, which tiles are each processed in steps of eight pixels.

The areas containing different ridge directions that are formed in this way often contain small isolated areas, small peaks and small troughs and, in another embodiment, these are smoothed out by adapting the pixels to the environment as predominant at the time, of the given pixel by means of smoothing filters.

Even somewhat larger isolated areas may produce errors so, in another embodiment, these are eliminated by further processing by determining the surface area of the areas determined up till then and suppressing areas whose surface area is of less than a preset size. For this purpose, provision is preferably made for the surface area to be determined by tracing the outlines of the areas using an edge-tracing algorithm.

In another embodiment of the method according to the invention, tiles for which, when direction was determined, the response of one of the Gabor filters gave a recognizable direction, are filtered with a Gabor filter adapted to this direction, tiles for which, when direction was determined, the responses of the Gabor filters gave two adjoining recognizable directions, are filtered with a Gabor filter adapted to the mean direction, and tiles for which no direction was determined or for which, when direction was determined, the responses of the Gabor filters gave two non-adjacent directions, are not filtered.

This embodiment has the advantage that the Gabor filters used to binarize the image can be more exactly adapted to the particular direction of the structures by virtue of the fact that this embodiment creates areas in which the ridge directions lie between the directions determined previously. If four different directions were determined previously, it is therefore possible to generate areas containing eight different directions and for these areas each to be filtered with a Gabor filter aligned to suit them.

To enable this Gabor filtering to be carried out with even less effort, provision may be made for the image to be binarized before the filtering with the Gabor filers adapted to direction. It has proved to be beneficial in this case if, to allow the image to be binarized, a threshold value is derived from a histogram of the image covering those pixels in which there is clear information on direction, and if the threshold value is selected in such a way that half the pixels are lighter than the threshold value and half are darker.

To complete the method according to the invention, provision is then made for further binarization to take place after the filtering with the Gabor filters adapted to direction. This binarization can be performed very easily by virtue of the fact that the responses of the Gabor filters are free of mean values and a threshold value can therefore be set at zero.

The method according to the invention can advantageously be implemented into a system for analyzing and binarizing images containing linear structures, and particularly images of prints from the skin. Such systems can advantageously be used for identifying human individuals and are especially intended for access control and the like.

These and other aspects of the invention are apparent from and will be elucidated with reference to the embodiments described hereinafter.

Figure 1:
FIG. 1 is a diagrammatic view of an image that has been made of a fingerprint.

The image 1 that is made, which is shown in FIG. 1, is a gray-scale image but because of the requirements that patent drawings have to meet it has been reproduced simply in black and white. Various disruptions can be seen in the image 1. Also, the region of interest formed by the pad of the finger stands out clearly from the background 4, i.e. the part of the sensing region of the sensor that is not covered by the pad of the finger. The greater part of the structures that are formed by ridges 2 and furrows 3 are discernible to the human eye. The visible disruptions however are a nuisance for any automatic analysis.

Figure 2:
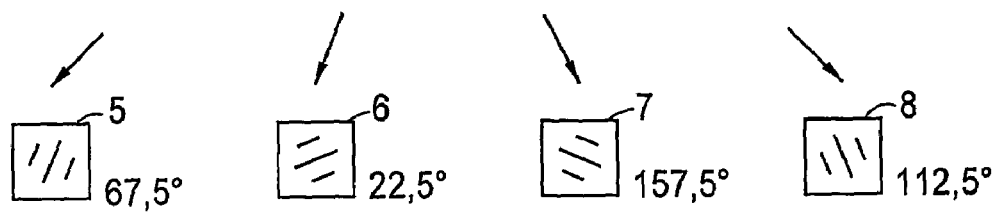
FIG. 2 shows the determination of direction with four different Gabor filters.
Figure 2:
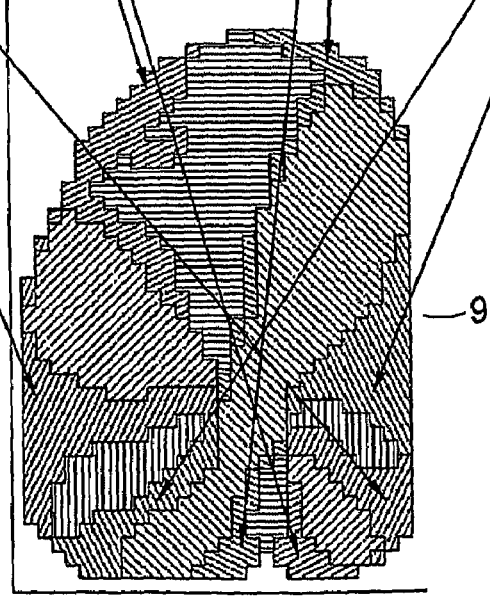

The image 1 is filtered as shown in FIG. 2 using four Gabor filters 5, 6, 7 and 8. The cosine function is indicated in each case by lines that represent the maxima, while the length of the lines indicates the Gaussian bell curve. The process is performed tile by tile, as is known per se to the man skilled in the art. In the method according to the invention, the filters 5 to 8 may be very much simplified.

At an image resolution of 500 dpi, good results were obtained with the following values:

$u_1 = (-1\ -1\ 0\ 0\ 1\ 2\ 1\ 0\ 0\ -1\ -1)^T$
$v_1 = (0\ 0\ 1\ 1\ 1\ 1\ 1\ 1\ 1\ 0\ 0)^T$
$u_2 = (0\ 0\ -1\ -1\ -1\ 0\ 1\ 1\ 1\ 0\ 0)^T$
$v_2 = (-1\ -1\ -1\ -1\ 0\ 0\ 0\ 1\ 1\ 1\ 1)^T$
$G_1 = u_1 v_1^T - u_2 v_2^T$
$G_2 = v_1 u_1^T - v_2 u_2^T$
$G_3 = v_1 u_1^T - v_2 u_2^T$
$G_4 = u_1 v_1^T - u_2 v_2^T$

The appearance of the filter masks $G_1$, $G_2$, $G_3$, $G_4$ is as indicated in FIG. 2 and they respectively accentuate the ridges at angles of 22.5°, 67.5°, 112.5° and 157.5°. The upper breakdown into vectors $u_1$, $v_1$, $u_2$ and $v_2$ makes fast Gabor filtering possible in the time domain.

The variances of the filter responses in overlapping tiles are now calculated. Each tile in which at least one of the four variances calculated exceeds a certain threshold value $v_{min}$—which is preset at a fixed level—is used for the calculation of an adaptive threshold value $v_{adap}$. Let N be the number of tiles in which the characteristic mentioned exists. All the variances of these tiles are stored in a list L, which means that L contains a total of 4N values. By means of the Quick Median algorithm, which is known per se and which allows an element of a given rank to be found in an unsorted list, $v_{adap}$ is determined in such a way that that the number of values in L that exceed $v_{adap}$ is ¼ times N (hence 9/16 of the values in L are to be smaller than $v_{adap}$ and 7/16 of the values in L are to be greater than $v_{adap}$). The threshold value $v_{adap}$ is used to find large continuous regions which have been smoothed in which direction is consistent.

For each tile of the image, a check is now made to see whether a clear item of information on direction can be obtained from the large regions of consistent direction. This is not the case if no region whatever of consistent direction can be found at the point concerned, if two regions that represent mutually orthogonal directions overlap precisely at the point concerned, or if all four directions are present at the point concerned. The regions that do not contain any clear information on direction are excluded from further processing. The items of information on direction that can be obtained can be seen from the Table below. In this Table, a 1 in one of the first four columns means that a tile is covered by a large continuous area of the relevant preferred direction. As shown in the Table below, areas are determined for eight directions with the four filters 5 to 8 and these areas are shown at 9 in FIG. 2

| 22.5° | 67.5° | 112.5° | 157.5° | Direction |
|---|---|---|---|---|
| 0 | 0 | 0 | 0 | Not clear |
| 1 | 0 | 0 | 0 | 22.5° |
| 0 | 1 | 0 | 0 | 67.5° |
| 1 | 1 | 0 | 0 | 45° |
| 0 | 0 | 1 | 0 | 112.5° |
| 1 | 0 | 1 | 0 | Not clear |
| 0 | 1 | 1 | 0 | 90° |
| 1 | 1 | 1 | 0 | 67.5° |
| 0 | 0 | 0 | 1 | 157.5° |
| 1 | 0 | 0 | 1 | 0° |
| 0 | 1 | 0 | 1 | Not clear |
| 1 | 1 | 0 | 1 | 22.5° |
| 0 | 0 | 1 | 1 | 135° |
| 1 | 0 | 1 | 1 | 157.5° |
| 0 | 1 | 1 | 1 | 112.5° |
| 1 | 1 | 1 | 1 | Not clear |

A histogram of the original image 1 (FIG. 1) is next produced covering the pixels in which there is clear information on direction. The threshold value b for the provisional binarization of the image is selected in such a way that half these pixels are lighter than b and half are darker. Because the number of gray levels to be dealt with in the original image is normally only limited, it is advisable for the histogram to be used rather than re-applying the Quick Median algorithm. The entire image is binarized by setting the pixels that are lighter than b to one and those that are darker than b to zero.

Figure 3:
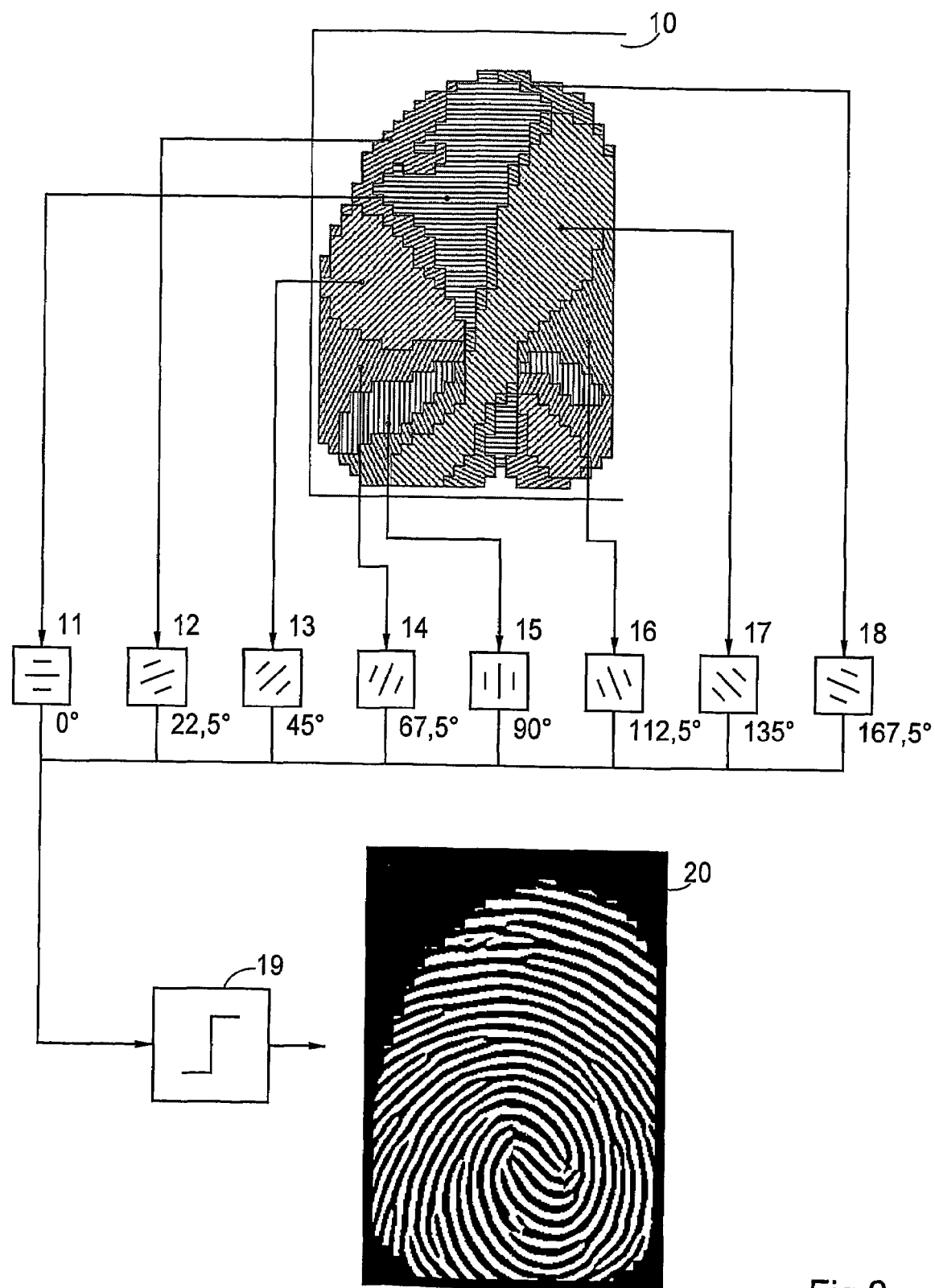
FIG. 3 shows the filtering with eight different Gabor filters, and the binarized image.

The binary image is now convoluted, as a function of the information on direction, with one of eight Gabor filters, which is what is shown in FIG. 3. However, for greater clarity, what has been shown is not the binary image to be filtered but a map 10 of the areas in which there are different directions. The arrows pointing to the filters are shown only for selected parts of overall areas.

The Gabor filters are not quite so greatly simplified as in the case of the first convolution (filtering). It is however again possible to manage with filter masks that can be broken down to a relatively small range of values. The design of the filter masks is as follows $u_0 = (1\ -2\ -6\ -9\ -6\ 2\ 12\ 16\ 12\ 2\ -6\ -9\ -6\ -2\ 1)^T$
$u_1 = (-1\ -3\ -7\ -8\ -4\ 4\ 12\ 16\ 12\ 4\ -4\ -8\ -7\ -3\ -1)^T$
$u_2 = (-3\ -4\ -5\ -4\ 1\ 8\ 14\ 16\ 14\ 8\ 1\ -4\ -5\ -4\ -3)^T$
$u_3 = (-1\ 0\ 2\ 4\ 8\ 12\ 15\ 16\ 15\ 12\ 8\ 4\ 2\ 0\ -1)^T$
$u_4 = (3\ 4\ 7\ 9\ 12\ 14\ 15\ 16\ 15\ 14\ 12\ 9\ 7\ 4\ 3)^T$
$v_1 = (3\ 3\ 1\ -5\ -11\ -13\ -9\ 0\ 9\ 13\ 11\ 5\ -1\ -3\ -3)^T$
$v_2 = (1\ -1\ -4\ -8\ -12\ -12\ -7\ 0\ 7\ 12\ 12\ 8\ 4\ 1\ -1)^T$
$v_3 = (-3\ -4\ -6\ -8\ -8\ -7\ -4\ 0\ 4\ 7\ 8\ 8\ 6\ 4\ 3)^T$
$G_0 = u_0 u_4^T$
$G_1 = u_1 u_3^T - v_1 v_3^T$
$G_2 = u_2 u_2^T - v_2 v_2^T$
$G_3 = u_3 u_1^T - v_3 v_1^T$
$G_4 = u_4 u_0^T$
$G_5 = u_3 u_1^T - v_3 v_1^T$
$G_6 = u_2 u_2^T - v_2 v_2^T$
$G_7 = u_1 u_3^T - v_1 v_3^T$ Because Gabor filters are approximately free of means, what can be used as a threshold value for the result of the convolution is zero for the binarization at 19. Hence, the pixel is set to zero wherever the result of the convolution is negative and to one wherever the result of the convolution is positive. Also, all the pixels in which there is no clear information on direction are set to zero. The result obtained is the binary image 20 that is shown in FIG. 3.

The invention claimed is:

1. A method of binarizing images containing linear structures, and particularly images of prints from the skin, characterized in that areas of an image are determined that are each distinguished by a preset approximate direction of the structures using a first set of Gabor filters to obtain continuous areas with different directions and in that the continuous areas of the image that have been obtained using the first set of Gabor filters are each further filtered exclusively with a single Gabor filter adapted to the given direction so that the continuous areas are filtered by corresponding Gabor filters according to the different directions of the continuous areas, wherein the single Gabor filter is selected from a second set of Gabor filters.

2. A method as claimed in claim 1, characterized in that the determination of the areas takes place, tile by tile of the tiles into which the image is divided, with the first set of Gabor filters of corresponding directions.

3. A method as claimed in claim 2, characterized in that the first set of Gabor filters includes four Gabor filters.

4. A method as claimed in claim 3, characterized in that the directions of the first set of Gabor filters are determined by angles of 22.5°, 67.5°, 112.5° and 157.5° to an edge of the image.

5. A method as claimed in claim 2, characterized in that, for the determination of the areas from the filter responses tile by tile of the tiles into which the image is divided, a variance is derived in each case from the given filter response and in that tiles having a variance that is greater than a preset threshold value are assigned to the given area.

6. A method as claimed in claim 5, characterized in that the derivation of the variances is performed for tiles that overlap one another.

7. A method as claimed in claim 6, characterized in that, at a resolution of approximately 500 dpi, the size of the tiles used for deriving the variance is 16×16 pixels, which tiles are each processed in steps of eight pixels.

8. A method as claimed in claim 1, characterized in that the pixels are adapted to the environment, as predominant at the time, of the given pixel by smoothing filters.

9. A method as claimed in claim 1, characterized in that the surface area of the areas so far determined is established and in that areas whose surface area is of less than a preset size are suppressed.

10. A method as claimed in claim 9, characterized in that the surface area is established by tracing the outlines of the areas by means of an edge-tracing algorithm.

11. A method as claimed in claim 2, characterized in that tiles for which, when direction was determined, the response of one of the Gabor filters gave a recognizable direction, are filtered with a Gabor filter adapted to this direction, in that tiles for which, when direction was determined, the responses of the Gabor filters gave two adjoining recognizable directions, are filtered with a Gabor filter adapted to the mean direction, and in that tiles for which no direction was determined or for which, when direction was determined, the responses of the Gabor filters gave two non-adjacent directions, are not filtered.

12. A method as claimed in claim 1, characterized in that the image is binarized prior to the filtering with Gabor filters adapted to direction.

13. A method as claimed in claim 12, characterized in that, to allow the image to be binarized, a threshold value is derived from a histogram of the image covering those pixels in which there is clear information on direction, and in that the threshold value is selected in such a way that half of the pixels are lighter than the threshold value and half are darker.

14. A method as claimed in claim 12, characterized in that further binarization takes place after the filtering with Gabor filters adapted to direction.

15. A method of binarizing images containing linear structures, and particularly images of prints from the skin, characterized in that areas are determined that are each distinguished by a preset approximate direction of the structures and in that the areas of the image that are determined are each filtered with a Gabor filter adapted to the given direction, further characterized in that the determination of the areas takes place, tile by tile of the tiles into which the image is divided, with further Gabor filters of corresponding directions and a variance is derived in each case from the given filter response and in that tiles having a variance that is greater than a preset threshold value are assigned to the given area, and further characterized in that the derivation of the variances is performed for tiles that overlap one another.

16. A method of binarizing images containing linear structures, and particularly images of prints from the skin, characterized in that areas are determined that are each distinguished by a preset approximate direction of the structures and in that the areas of the image that are determined are each filtered with a Gabor filter adapted to the given direction, further characterized in that the determination of the areas takes place, tile by tile of the tiles into which the image is divided, with further Gabor filters of corresponding directions, and further characterized in that tiles for which, when direction was determined, the response of one of the Gabor filters gave a recognizable direction, are filtered with a Gabor filter adapted to this direction, in that tiles for which, when direction was determined, the responses of the Gabor filters gave two adjoining recognizable directions, are filtered with a Gabor filter adapted to the mean direction, and in that tiles for which no direction was determined or for which, when direction was determined, the responses of the Gabor filters gave two non-adjacent directions, are not filtered.

* * * * *